(No Model.)
A. DELKESCAMP.
SLED.
No. 312,980. Patented Feb. 24, 1885.
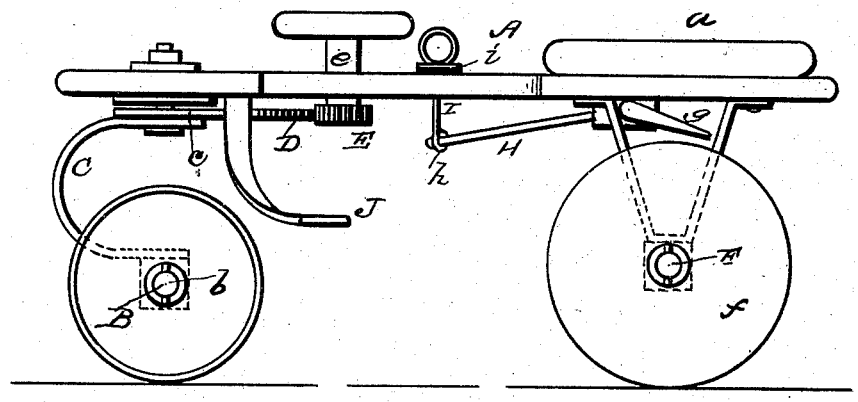
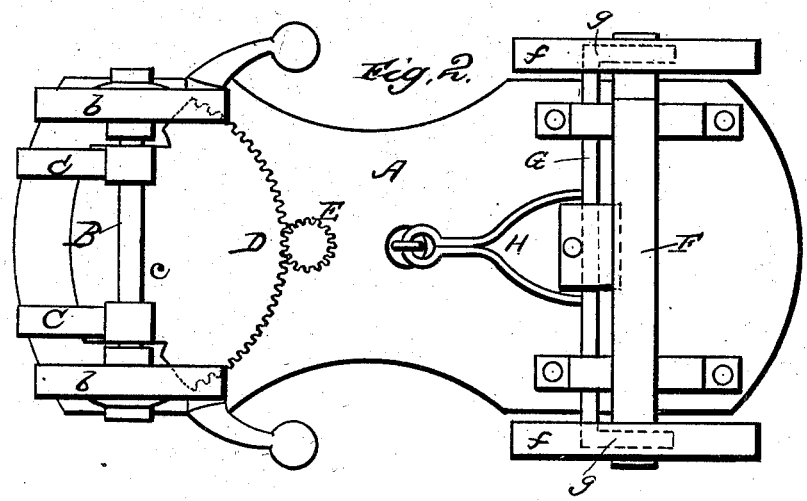
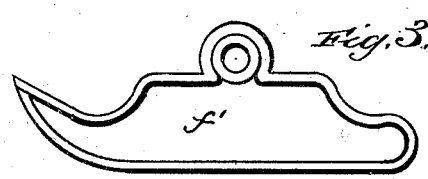
WITNESSES
INVENTOR
A. Delkescamp,
by Andrews & Smith
his ATTORNEYS

United States Patent Office.

ADOLPH DELKESCAMP, OF WATERBURY, CONNECTICUT, ASSIGNOR TO THE METAL WHEEL COMPANY, OF SAME PLACE.

SLED.

SPECIFICATION forming part of Letters Patent No. 312,980, dated February 24, 1885.

Application filed September 29, 1884. (No model.)

*To all whom it may concern:*

Be it known that I, ADOLPH DELKESCAMP, a citizen of the United States, residing at Waterbury, in the county of New Haven and State of Connecticut, have invented certain new and useful Improvements in Sleds; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of my device. Fig. 2 is a bottom view of the same, and Fig. 3 is a side view of a runner.

This invention relates to improvements in roller-sleds, or such as have their wheels formed to be runners in winter; and its object is to provide such a sled with a novel and efficient steering apparatus and with a brake.

The invention consists in the construction and novel arrangement of devices, as will be hereinafter more fully set forth, and particularly pointed out in the claim appended.

In the accompanying drawings, A represents the body of the sled, having the seat $a$ at its rear end.

B is the front axle, carrying the wheels $b\ b$, and turning in bearings on the lower ends of the spring bars or arms C C. The said spring-bars curve forward and upward in a semicircle from the axle, and have their upper ends fixed to the plate $c$, which is centrally pivoted to the body of the sled, and turns upon a similar plate fixed thereto.

D is a rack curved on the arc of a circle, fixed to the plate $c$, and pivoting therewith. The rack extends backward and gears with a pinion, E, fixed to the lower end of a vertical shaft, $e$, which extends up through the body A, pivoting therein, and has fixed to its upper end a hand-wheel, as shown, by which it may be easily rotated by a person sitting on the seat $a$.

F is the rear axle, carrying the wheels $f\ f$, and secured to the body by proper supports. The wheels $f\ f$, like the wheels $b\ b$, are made of sheet metal, and both have wide flanges standing at right angles to their rims.

$f'\ f'$ are runners of proper shape, provided with links, so that they may replace the wheels on the axle when it is desirable to use the device as a sled.

G is a rod running transversely across and pivoted centrally on the under surface of the body a little to the front of the rear axle. The rod pivots in a block fixed to the surface of the body, and has its ends bent back at right angles over the top of the rear wheels, $f$.

H is the brake-lever, fixed by its two arms to the rod or shaft G, one arm being attached on each side of the block. The said lever extends forward and downward from the rod, and has its end formed into a loop, which is fixed by a link, $h$, to the lower end of the descending rod or chain I. The said rod passes through a proper opening in the body, and has its upper end formed into a ring or hand-hold.

$i$ is a stop-plate to prevent the rod from descending too far in the opening in the body.

J J are stops made of twisted pieces of sheet metal, as shown.

A person sitting on the seat $a$ can, by lifting on the rod I, raise the brake-lever, rotate the shaft G, and bring its ends $g$ to bear on the wheels $f$, thus stopping their rotation. The front wheels are also easily turned and the sled steered from the seat by means of the hand-wheel, pinion, and rack.

Having thus described my invention, what I claim as new, and desire to secure by Letters Patent, is—

The combination, with the body, of the branched brake-lever H, the transverse brake-bar G, having its opposite ends bent rearwardly at right angles to extend above the rear wheels, as at $g$, and the lift-rod I, connected at its lower end to the brake-lever, whereby the brake may be applied by lifting the said rod, substantially as specified.

In testimony whereof I affix my signature in presence of two witnesses.

ADOLPH DELKESCAMP.

Witnesses:
F. S. LEWIS,
E. L. FRISBIE, Jr.